United States Patent [19]

Anderson et al.

[11] 4,430,711
[45] Feb. 7, 1984

[54] CENTRAL PROCESSING UNIT

[75] Inventors: Jared A. Anderson, Woodside; Robert V. Van Gelder, Berkeley; Lauren F. Yazolino, Oakland; Jimmy E. Braun, Orange, all of Calif.

[73] Assignee: Signetics Corporation, Sunnyvale, Calif.

[21] Appl. No.: 482,818

[22] Filed: Apr. 7, 1983

Related U.S. Application Data

[63] Continuation of Ser. No. 154,632, May 30, 1980, abandoned.

[51] Int. Cl.³ .............................................. G06F 9/26
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,999,052 | 12/1976 | Gooding | 364/200 |
| 4,041,461 | 8/1977 | Kratz | 364/200 |
| 4,041,462 | 8/1977 | Davis | 364/200 |
| 4,079,451 | 3/1978 | Woods | 364/200 |
| 4,128,878 | 12/1978 | Yasuhara | 364/200 |
| 4,206,503 | 6/1980 | Woods | 364/200 |
| 4,245,302 | 1/1981 | Amdahl | 364/200 |
| 4,300,195 | 11/1981 | Raghunathan | 364/200 |
| 4,367,524 | 1/1983 | Budde et al. | 364/200 |
| 4,370,709 | 1/1983 | Fosdick et al. | 364/200 |
| 4,371,931 | 2/1983 | Catiller et al. | 364/200 |

OTHER PUBLICATIONS

"Am 2900 Bipolar Microprocessor Family", Advanced Microdevices, Inc., pp. 1–15, 34–35, Jun. 1975.
"A Microprogrammed 16-Bit Computer", Advanced Microdevices, Inc., pp. 1–49, Sep. 1976.

Primary Examiner—James D. Thomas
Assistant Examiner—Archie E. Williams
Attorney, Agent, or Firm—Allegretti, Newitt, Witcoff & McAndrews, Ltd.

[57] ABSTRACT

A central processing unit capable of executing the IBM System/370 Universal Instruction Set is disclosed. The instruction set establishes the functional specifications for the processing unit, features of which include: 8-bit (byte) alphanumeric coding, 4-bit packed decimal coding (2 digits per byte), two's complement fixed-point binary arithmetic, two levels of indexing, sixteen 32-bit (4 byte) addressable general registers, four 64-bit floating point registers, and program status word and control registers. Principal features of the hardware architecture include the use of a single main data/instruction bus, transfers to and from the main bus being made under encoded microprogram control, and placement of the fixed-point binary arithmetic logic unit elements and the associated sixteen general registers on a single cascaded group of LSIC chips which operate under control of the microcode. The microcode store is addressed by a microprogram control unit which includes a control counter stack memory and a return address stack memory permitting up to sixteen levels of microprogram sub-routines to be used.

1 Claim, 12 Drawing Figures

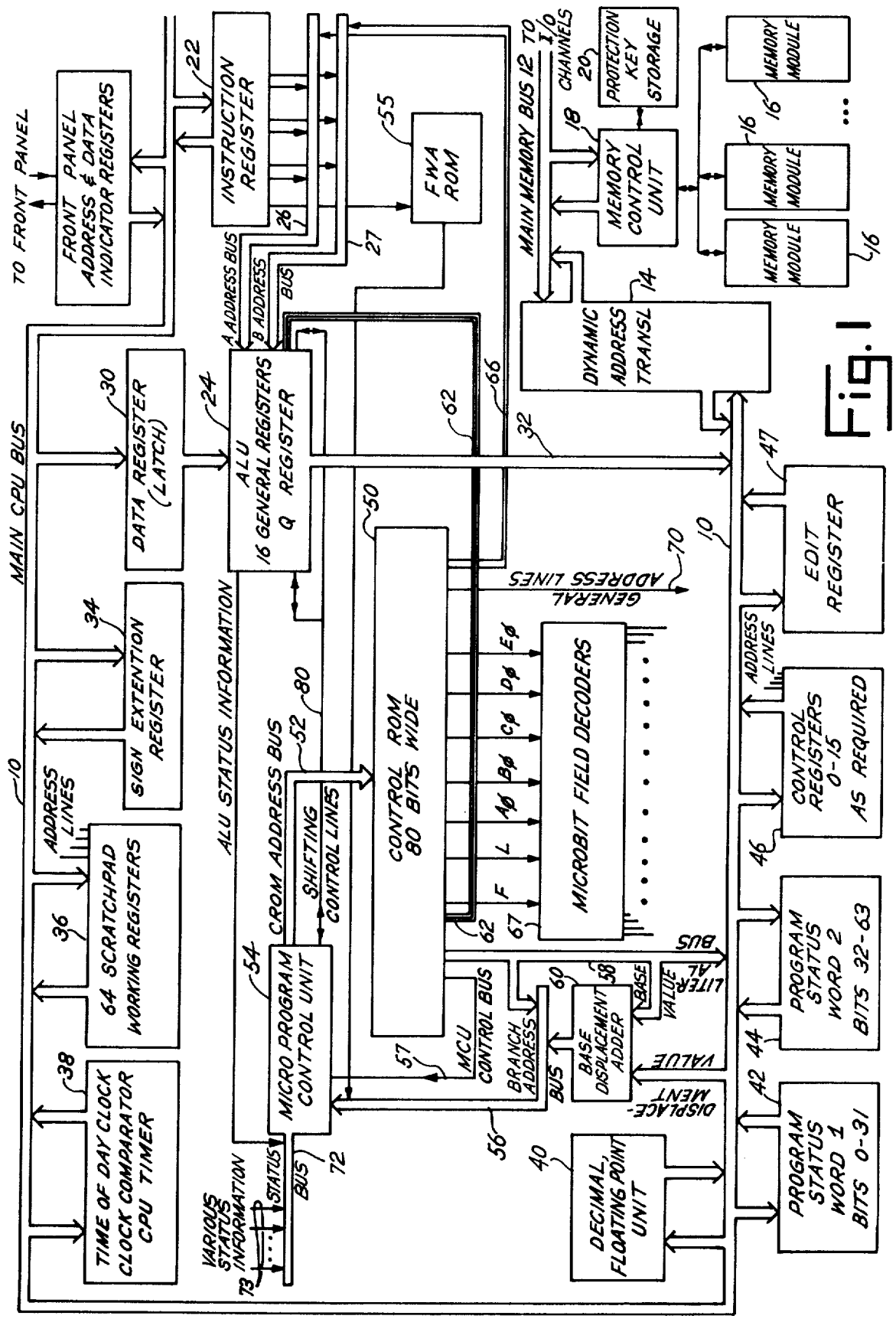

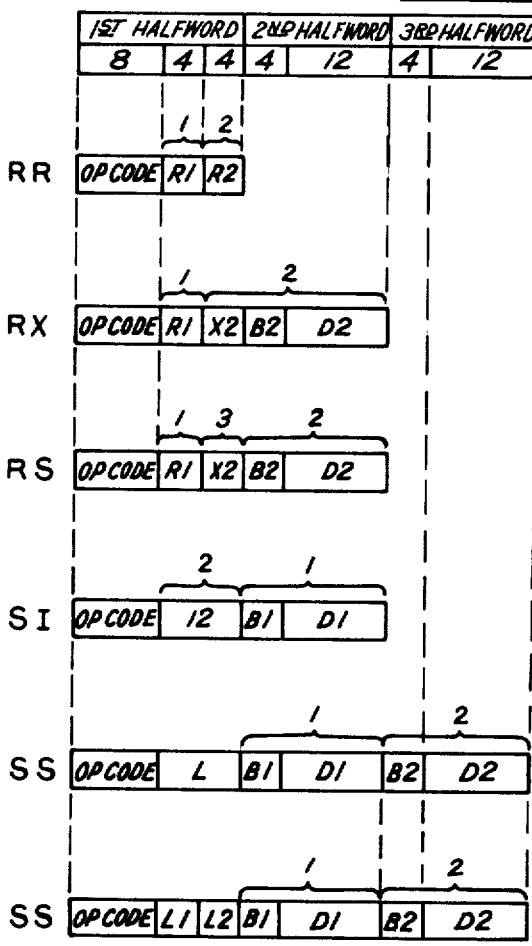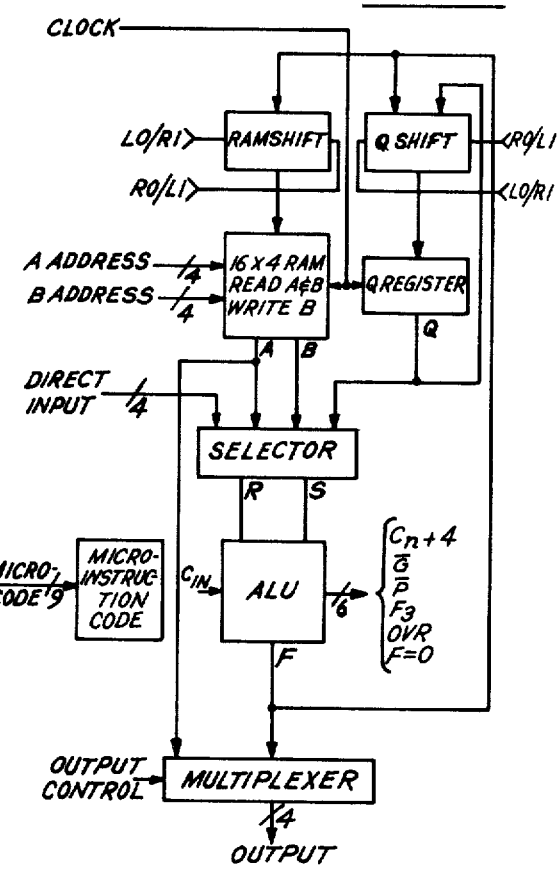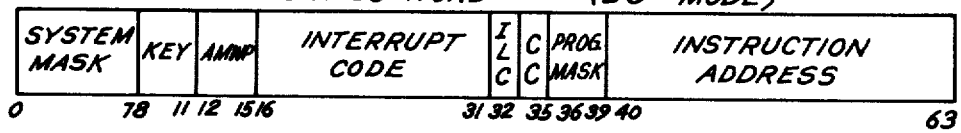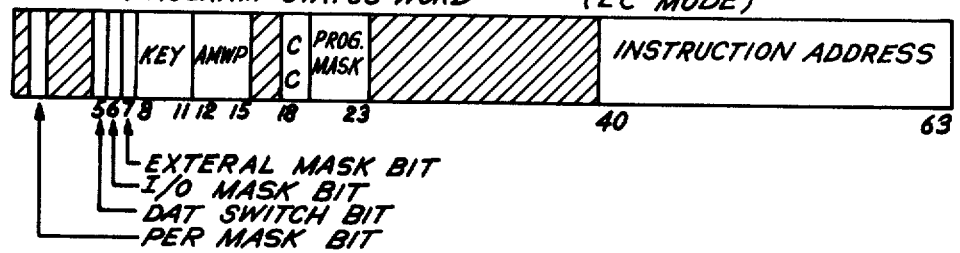

CENTRAL PROCESSING UNIT

This application is a continuation, of application Ser. No. 154,632, filed May 30, 1980, and thereby, a division of Ser. No. 894,925, filed Apr. 10, 1978, both now abandoned.

BACKGROUND OF THE INVENTION

This invention relates to electronic data processing systems and more particularly to a central processing unit for use in such systems.

SUMMARY OF THE INVENTION

It is a principal object of the present invention to provide a powerful, low cost central processing unit capable of executing the so-called "universal instruction set" employed in the widely-used IBM System/360 and System/370 central processors, as well as processors produced by other manufacturers.

It is another object of the present invention to provide a processor in which frequently executed functions are carried out by low cost, high speed, large scale integrated circuit (LSI) components.

In the main the central functions of the processor to be described are instrumented with existing super high speed (Schottky) TTL LSI building blocks. Because such circuits are used in a variety of other digital applications, low manufacturing cost is achieved through volume production. By thus reducing component costs, the resulting processor provides a better cost-performance ratio than could be achieved through the use of circuits having an ad hoc design.

In particular, and in accordance with an important feature of the present invention, all of the functions needed to carry out the arithmetic logic and general register functions specified by the instruction set are concentrated in a cascaded group of microprocessor "bit-slice" devices so that the frequently executed register-to-register and index-register functions are carried out at very high speeds.

In accordance with a further feature of the invention, microcode efficiency is further improved by the provision, in the microprogram sequencing unit, of automatically operated sub-routine stacks containing both return addresses and control counts and of indexed base displacement memory accesses to the control read only memory.

DESCRIPTION OF THE DRAWINGS

These and other features and advantages of the present invention may be better understood through a consideration of the following detailed description. In the course of this description reference will frequently be made to the attached drawings, in which:

FIG. 1 is a block diagram illustrating the principal, functional components of a central processing unit employing the principles of the invention.

FIG. 2 illustrates the format of the six basic types of instructions used in the established instruction set.

FIG. 3 is a chart illustrating the layout of the information fields which make up the program status word as used in the BC mode.

FIG. 4 illustrates the field layout of the PSW in the EC mode.

FIG. 5 is a block diagram illustrating the principal elements of an available TTL microprocessor slice chip employed to instrument the ALU and general register functions required by the established instruction set.

DETAILED DESCRIPTION

General Description

Figure 6:
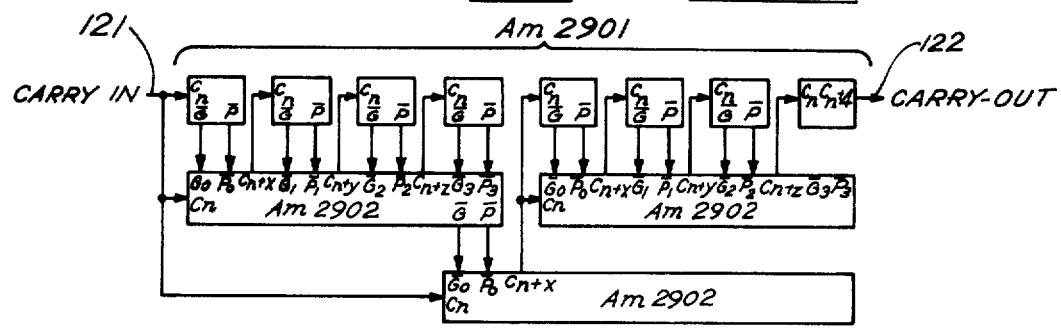
FIG. 6 shows the manner in which eight microprocessor slices of the type shown in FIG. 5 are interconnected to form a unit having a 32-bit capacity.

FIG. 1 of the drawings illustrates, in block diagram form, the basic configuration of a central processing unit and main memory which employs the principles of the invention. In the central processing unit, substantially all data and instruction transfers between functional components of the system take place on a single information highway, the main CPU bus 10. Information is transferred between the CPU bus 10 and a main memory bus 12 by way of a dynamic address translation unit 14. Data and instructions are stored in and fetched from memory modules 16 by a memory control unit 18 which also has access to a protection key storage unit 20.

Instructions to be executed are tansferred from memory via the memory bus 12 and the CPU bus 10 to an instruction register 22. As will be discussed in more detail later, an instruction contains an operation code ("op code") indicating which one of the many possible instruction types within the instruction set is to be executed. In addition, the instruction stored in register 22 may contain the identification (address) of one or more general registers which are to be used during the execution of the instruction. These general register addresses are passed directly from the instruction register to a combined ALU, general register and Q register unit 24 via the A address bus 26 and the B address bus 27. Data is also passed to the unit 24 from the CPU bus 10 via a data register (latch) 30, while output data from the unit 24 is returned to the main bus 10 via the ALU output bus 32.

Other functional units which are selectively employed to execute instructions within the instruction set and which communicate with the remainder of the system by way of the CPU bus 10 include:

A sign extension register 34 employed to propagate the sign bit (contained in the most significant digit position) of a halfword through the more significant bit positions when a half-word is expanded into a fullword;

A scratch pad memory 36 capable of holding 64 fullwords at working register locations addressable by microcode in the manner to be described;

A system clock unit 38 containing a time of day clock, a CPU timing clock and a clock comparator which are accessed by selected instructions within the instruction set;

A decimal and floating point arithmetic unit 40 employed to perform arithmetic functions on numerical data expressed in packed decimal or floating point fomat. (The ALU within unit 24 noted earlier performs fixed-point binary arithmetic and logical operations);

A pair of program status word registers 42 and 44 which together hold the 64 bit long program status word (PSW) which, as will be described, contains fields which are individually manipulated during the execution of instructions within the instruction set;

A group of up to 16 control registers 46 which represent, in effect, an extension of the PSW. These control registers are addressable by microcode and by certain privileged instructions in the instruction set; and An edit register 47 which is employed, under microcode control, to mask, rearrange, and otherwise manipulate and edit fields within a word as required.

In general, the access width of all of the functional units noted above is one fullword (32 bits) as is the access width of the main memory bus 12 and the CPU bus 10. Thus, as contemplated by the invention, substantially all data and instruction transfers take place one fullword at a time. Also, in general, at any given time when an information transfer takes place on the CPU bus 10, only one of the functional units will be connected to the bus 10 as a sending device or source, and only one of the units will be connected to the bus as a receiving device or destination. The activation of a particular functional unit as a source or as a destination is accomplished, as will be described, by microcode from an addressed location in a control read only memory (CROM) 50.

The control memory 50 receives address information via the CROM address bus 52 from the microprogram control unit 54. In operation, the microprogram control unit (MCU) 54 receives the address of the first microinstruction to be executed from a first word address (FWA) read only memory 55 which has its input connected to the op code field of the instruction register 22 and which supplies the address of the first microinstruction to be executed to the MCU 54 via a branch address bus 56. The MCU 54 then delivers the necessary sequence of CROM addresses via the bus 52 to the control memory 50 in order to generate the sequence of microcode required for the execution of the instruction in the instruction register 22.

Each microcode word from the control memory 50 may be divided into nine separate fields as depicted in FIG. 1:

(1) MCU control bits transmitted via bus 57 to the microprogram control unit 54 and which serve, in essence, as the op code portion of an MCU instruction which also includes:

(2) Branch address bits delivered from the control memory 50 via the branch address bus 56 to the MCU 54. The branch address field of a microcode word may also be transmitted as a literal directly from control memory 50 to the CPU bus 10 via a literal bus 58. Alternatively, the byte address applied to the MCU 54 via bus 56 may be an indirect address made up of the sum of a base value obtained from control memory 50 and a displacement value obtained from the CPU bus 10, the two being combined in a base displacement adder 60;

(3) ALU control bits transmitted via bus 62 to the unit 24. The ALU control bits include an op code which directs the ALU unit 24 to perform a selected one of several possible operations, and additional bits which control the routing of information within the unit 24;

(4) A five-bit F (FROM) field applied to a decoder 67 to energize a selected one of 31 signal lines, each serving to enable one of the functional units connected to the CPU bus 10 as a transmitting or source device;

(5) A five-bit L (LOAD) field delivered to decoder 67 to enable one of 31 possible devices as a receiving or destination device for information on the CPU bus 10;

(6) Five general-purpose microbit fields (A∅, B∅, C∅, D∅, and E∅) connected to decoder 67 for energizing additional source and destination access lines (in some cases redundantly with those energized by the F-field and the L-field), as well as numerous miscellaneous functional control lines to be discussed later.

(7) General register address lines 66 for directly addressing selected general registers in the A2U unit 24 from microcode; and (8) General address microbits delivered via the address lines 70 and used to address, among other things, a selected one of the 64 working registers 36 or a selected one of the 16 control registers 46.

Finally, to complete the discussion of FIG. 1, it should be noted that the microprogram control unit 54 receives and is responsive to status information generated within unit 24 and delivered to the MCU status bus 72, which also receives additional machine status information over the status lines 73 (most notably machine check interrupts caused for example, by the detection of parity errors; program check interrupts caused by invalid instructions or data; and IO interrupts issued when a channel handling an input or output function requires the attention of the CPU). In addition, when the unit 24 is required to execute logical shift operations (e.g., during fixed point binary multiplication and division) shift control information is transmitted between the MCU 54 and the unit 24 via the shift control lines 80.

The Instruction Set

The instruction register 22 is the user's (programmer's) window to the processor. A computer program is set of instructions stored in main memory which are sequentially fetched and placed in the instruction register for execution—although not necessarily in the same sequence as stored. Each instruction has a format which may be of several types, depending upon the makeup of the instruction set.

The processor contemplated by the present invention is capable of executing each of the instructions in the Universal Instruction Set executable by the IBM System/370 family of processors. In the description which follows, it has been assumed that the reader has a thorough familiarity with the functional characteristics of the System/370 instruction set. A few brief comments on the general makeup of this instruction set will be presented below by way of background, and these comments may be skipped by those experienced in using this instruction set. Those without such experience may wish to consult one of the many available texts which treat the subject, such as *Computer Organization and the System/370*, by Harry Katzan, Jr., Van Nostrand Reinhold (1971) which includes an introduction to computers and programming, as well as in introduction to the System/370 instruction set for people experienced in computer science. For a complete description and definition of the attributes of the System/370 instruction set, the reader should consult *IBM System/370 Principles of Operation*, Form GA22-7000, IBM Corporation.

There are different types of instructions in the instruction set, each with its own unique format. The six machine instruction formats are shown in FIG. 2 of the drawings.

As seen in FIG. 2, instructions may be 2, 4 or 6 bytes long. Instructions in the RR (register-register) format are 2 bytes long. Like the other types of instructions, the first byte of an RR instruction contains an 8-bit op code. The second byte contains the address of two general register operands. Each 4-bit operand address is capable of specifying one of 16 addressable general registers. These registers are thus "visible" to the programmer who may use them in "scratch pad" fashion to manipulate data.

The second instruction type shown in FIG. 2 is the RX (register and indexed storage) instruction. The op code of the RX instruction occupies the first byte, the first operand is a register whose address is given by bits 8 through 11, and the second operand is a location in main storage whose address is given by the sum of the contents of two general registers X2 and B2 and the numerical value D2, called the displacement, contained in bit positions 20 through 31. The general register X2 specified by bits 12 through 15 is used as an index register, while the register B2 specified by bit positions 15 through 19 is employed as a base register. Instructions in the RX format thus permit main storage accesses to be made through two levels of indexing.

The third instruction format shown in FIG. 2 is that of the RS (register and storage operation) instruction. Using the RS format, two general register operands R1 and R3 are identified and a single main storage operand, which is identified by base address and displacement only, is identified.

The fourth instruction format is used for immediate data and storage operation and is referred to as the type SI instruction. Bits 8 through 15 contain a one-byte immediate data value while bits 16 through 31 are employed to indicate a base register address and a displacement which are combined to identify a main storage operand.

The fifth instruction type shown in FIG. 2 follows the SS (storage to storage) format. Bit positions 16 through 47 identify two main storage operands by base register and displacement. Bit positions 8 through 15 specify one or two field length values.

As can be seen from the foregoing examples, the instruction set specifications comprises a complete and exhaustive definition of the manner in which information is manipulated between those storage locations which are "visible" to the programmer. These visible locations include, in addition to the addressable main memory and the sixteen general registers, the program status word (PSW) (registers 42 and 44 in FIG. 1), control registers 46, the system clocks 38 and the protection key storage unit 20. The contents of the PSW are shown in FIGS. 3 and 4 of the drawings.

The ALU General Register and Q Register

In the preceding discussion of the standard System/370 instruction set, emphasis was placed on the functional units which are visible to the programmer. Attention will now be turned to the specific hardware contemplated by the present invention for manipulating information as *required* by the instruction set. At this point it should be noted that, while the instruction set is exhaustively specific in defining *what* is to happen when each instruction is executed (as far as the contents of the programmer-visible registers are concerned), the instruction set specifications are absolutely silent about and unconcerned with *how* each function is to be accomplished. The instruction set is not concerned with actual hardware nor is it concerned with the nature of any subsequence of operations necessary to achieve the desired function. Such considerations are left entirely to the designer of the particular processor and particular processors can differ widely even though they execute identical instruction sets.

For efficiency, a processor should be especially adept at handling those instructions which occur most frequently. In practice, available statistics suggest that the most commonly executed instructions are those employing the RR and RX formats, which suggests the importance of efficient manipulation of data between the ALU and the 16 general registers.

In accordance with the principal feature of the present invention, the ALU/general register manipulations required by the Universal Instruction Set are carried out by a cascaded group of transistor-transistor logic LSIC microprocessor slice chips. A group of eight such chips interconnected by three carry look-ahead circuit chips concentrate all of the functions of a fixed point binary arithmetic and logic unit, the 16 general registers, and an auxiliary accumulator called the Q register.

A block diagram of the microprocessor slice appears in FIG. 5 while FIG. 6 illustrates the manner in which eight such microprocessor chips are interconnected by means of three carry look-ahead chips.

The specific microprocessor slice shown in FIG. 5 is the model Am2901 four-bit microprocessor slice marketed by Advanced Micro Devices Inc. The carry look-ahead chip is the companion model Am2902 marketed by the same manufacturer. Detailed information on these devices is contained in *Am2900 Bipolar Microprocessor Family*, Advanced Micro Devices, Inc., Sunnyvale, Calif.

Figure 7:
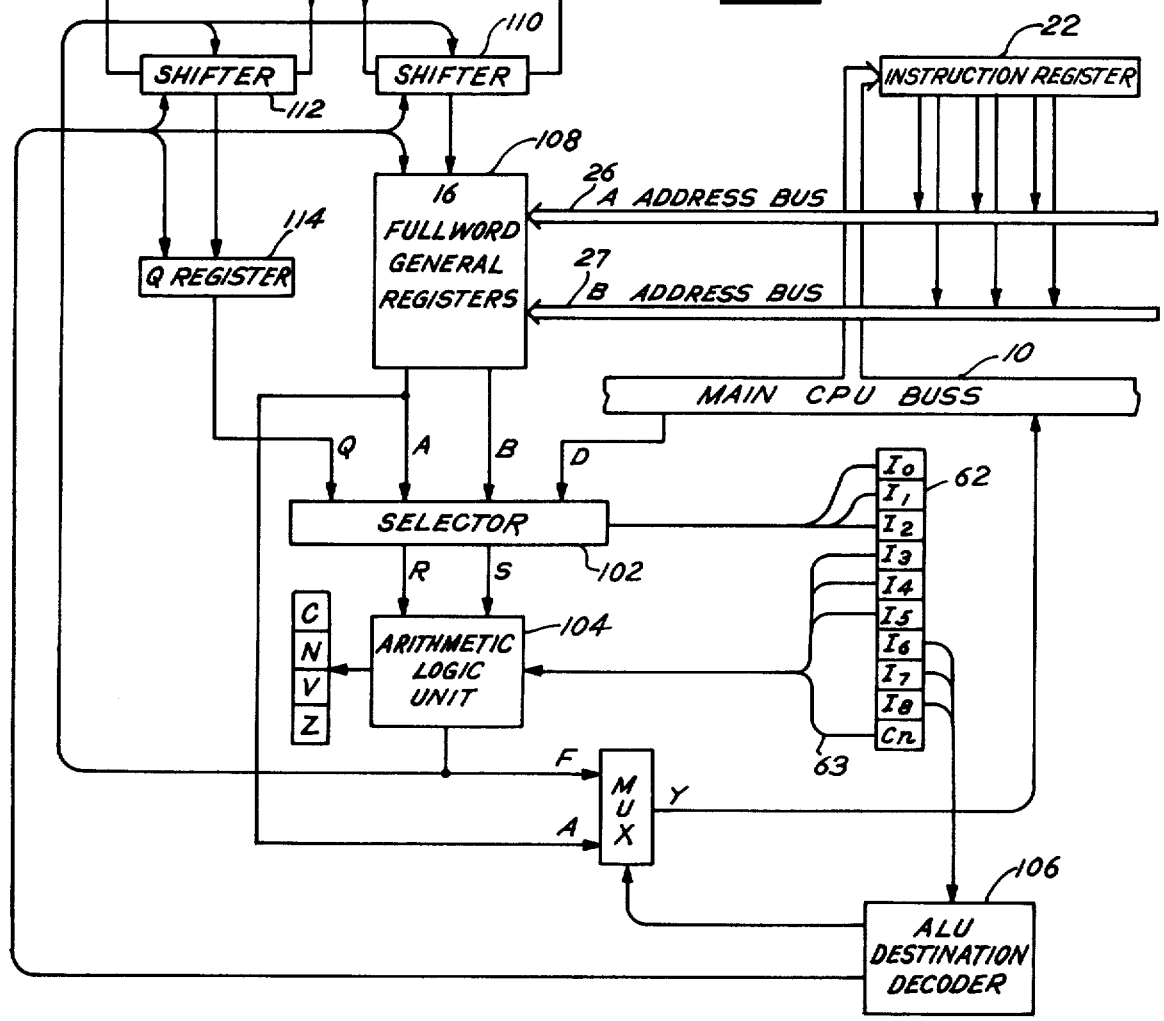
FIG. 7 is a block diagram illustrating the principal featues of the combined ALU, general register and Q register unit.

FIG. 7 is a block diagram of the resulting combined ALU, general register and Q register unit which was shown at 24 in FIG. 1 and which is interconnected with the remainder of the system in the manner to be described.

As noted earlier, the unit 24 operates under the control of microbits from the control read only memory (CROM) 50, these microbits being depicted as bits $I_0$–$I_8$ and $C_n$ in FIG. 7. Bits $I_0$–$I_2$ control a selector 102. Selector 102 delivers R and S operand values to the arithmetic logic unit 104. The R and S values are selected from the following: Q, the contents of the Q register; A, the contents of that general register specified by the value on the A address bus 26; B, the contents of the general register specified by the value on the B address bus 27; and D, a value obtained directly from the main CPU bus 10. The selection occurs as shown on the following Table I.

TABLE I

| $I_2$ | $I_1$ | $I_0$ | R | S |
|---|---|---|---|---|
| L | L | L | A | Q |
| L | L | H | A | B |
| L | H | L | O | Q |
| L | H | H | O | B |
| H | L | L | O | A |
| H | L | H | D | A |
| H | H | L | D | Q |
| H | H | H | D | O |

Thus, for example, it is desired to add the contents of the Q register to the value on the CPU bus 10 a binary 011 is applied to microbits $I_0$, $I_1$ and $I_2$, respectively.

Microbits $I_3$, $I_4$ and $I_5$ select one of eight possible ALU functions as shown by Table II below.

TABLE II

| $I_5$ | $I_4$ | $I_3$ | |
|---|---|---|---|
| L | L | L | R plus S |
| L | L | H | S minus R |
| L | H | L | R minus S |
| L | H | H | R OR S |
| H | L | L | R AND S |
| H | L | H | R AND S |
| H | H | L | R EX-OR S |
| H | H | H | R EX-NOR S |

The microbit $C_n$ is a carry input line (seen at 121 in FIGS. 6 and 7) which, when energized, adds a binary 1 to the result F produced by the ALU 104.

Finally, the three microbits $I_6$, $I_7$ and $I_8$ are applied to an ALU destination decoder 106 which controls the routing of information as shown in Table III below.

TABLE III

| $I_8$ | $I_7$ | $I_6$ | G.R. Shifter 110 | Q Shifter 112 | G.R. Source | Q Reg. Source | Y Out Source |
|---|---|---|---|---|---|---|---|
| L | L | L | — | — | — | F | F |
| L | L | H | — | — | — | — | F |
| L | H | L | — | — | F | — | A |
| L | H | H | — | — | F | — | F |
| H | L | L | LEFT | LEFT | — | — | F |
| H | L | H | LEFT | — | — | — | F |
| H | H | L | RIGHT | RIGHT | — | — | F |
| H | H | H | RIGHT | — | — | — | F |

Information from the output of the ALU 104 may be shifted one bit to the right, one bit to the left, or may maintain its original alignment as it is loaded into that one of the 16 general registers 108 specified by the address on the A address bus 26. Shifting is accomplished by the shifter 110 and bi-directional signal lines $F_0$ and $F_{31}$ which are connected to allow a bit shifted out of the shifter 110 to be captured, while permitting a new bit to be inserted into the vacant position. A similar shifter 112 is connected between the output of the ALU 104 and Q register 114. As will be discussed later, the shifted bit signal lines $F_0$, $F_{31}$, $Q_0$ and $Q_{31}$ communicate with the microprogram control unit (seen at 54 in FIG. 1).

Four status bits C, N, V and Z are generated by the ALU 104 and are also passed to the MCU 54. The C-bit (on line 122 shown in FIG. 6) is a 1 whenever the carry from the highest order bit position occurs. The N-bit is a 1 when the highest order bit (sign bit $F_{31}$) is a 1. The V-bit is a 1 when an overflow occurs; and the Z-bit is a 1 when the ALU result equals 0.

Microprogram Control Unit

Figure 8:
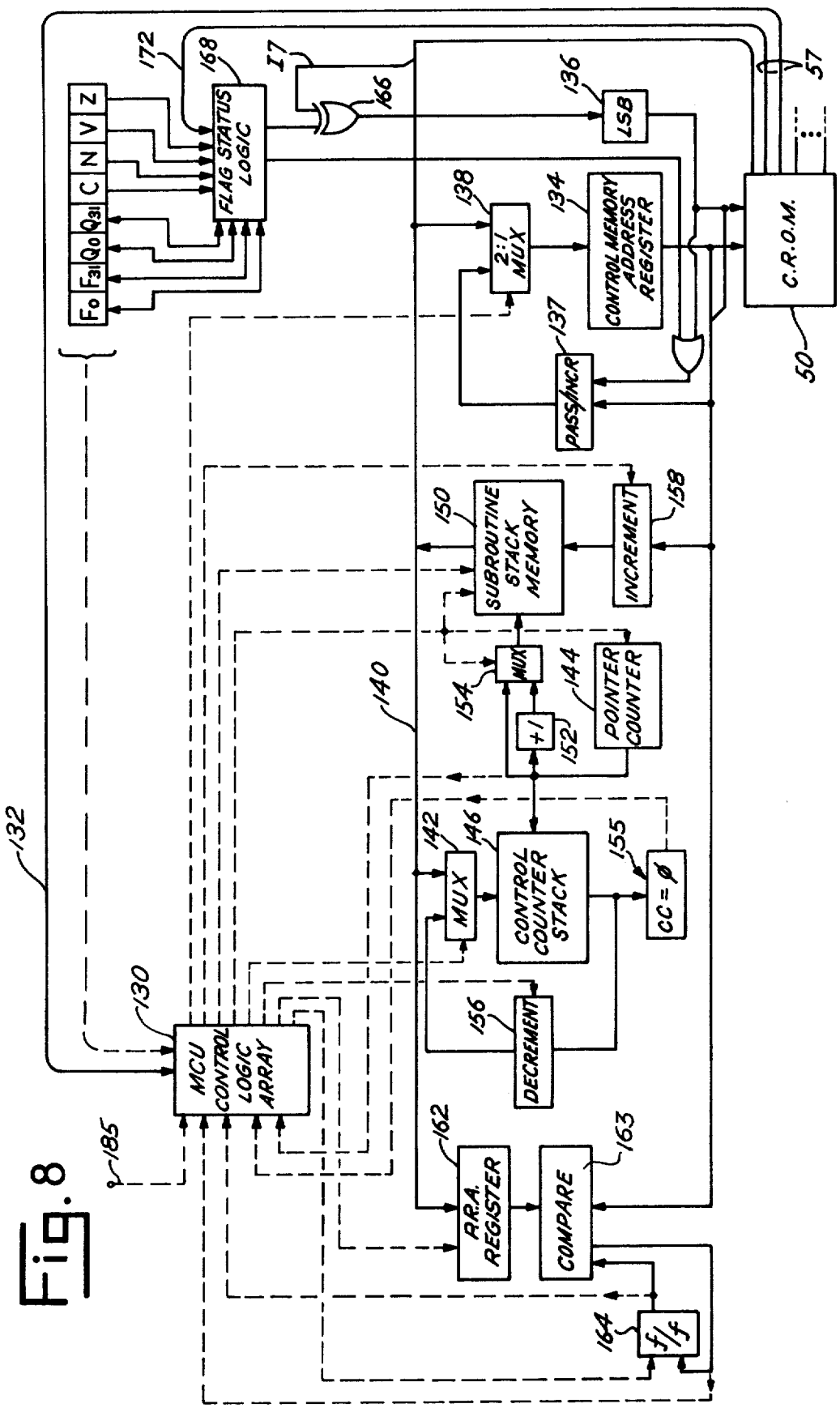
FIG. 8 is a block diagram showing the principal functional elements of the microprogram logic unit seen at 54 in FIG. 1.

As discussed earlier in connection with FIG. 1 of the drawings, the microprogram control unit 54, which is shown in more detail in FIG. 8 of the drawings, produces a sequence of control memory addresses which are applied to the control memory 50 which, together with its associated decoders, generates the control signals required to sequence the machine through a series of suboperations which effect the execution of the machine instruction in the instruction register 22. The microprogram control unit is itself a small processor capable of executing eight different types of instructions. A three-bit MCU op code generated by the control memory 50 is applied (along with other inputs from the CROM 50) to the MCU control logic array 130 via the signal line 132. The operation of the MCU may perhaps best be understood by considering each of the eight MCU instructions separately:

The NEXT Instruction (Octal 0):

The NEXT instruction causes the MCU to proceed to the next microinstruction pair in the sequence. Microinstruction addresses are stored in a control memory address register (CRAR) 134. The least significant bit position of the control memory address is stored separately in the LSB register 136. Thus, the address in CRAR 134 is in fact the address of *a pair* of microinstructions and the determination of which of the two instructions in the pair is to be executed is determined by the setting of the LSB register 136. When a NEXT instruction is executed, the value stored in CRAR 134 is incremented by one in the pass/increment unit 137 and returned to the CRAR 134 via a two-input multiplexer (MUX) 138.

The COUNTER Instruction (Octal 1):

The COUNTER instruction directs the MCU to proceed to the next microinstruction pair in the sequence and also to load a value from the N-bus 140 through a two-input multiplexer 142 into that control counter in the stack 146 which is pointed to by the pointer counter 144. The pointer counter 144 also points to a register within a sub-routine stack memory 150. The combination of a unit adder 152 and a two-input multiplexer 154 permits immediate selection of either (1) the register pointed to by counter 144 or (2) the next higher numbered register in the stack.

The pointer counter 144 initially points to location 0 in both the control counter and sub-routine stacks. Each time a sub-routine is called the pointer counter is incremented and the current values for the calling routine are retained in the stack. When a return is made from a sub-routine the pointer counter 144 is decremented. If the pointer counter 144 is a four-bit counter and the stacks 145 and 150 are 16 registers deep, 16 levels of sub-routines may be handled.

The control counters in stack 146 are eight bits long, allowing counts of up to 256 to be stored.

The LOOP Instruction (Octal 2):

The LOOP instruction is analogous to the assembly language "branch on count" instruction (BCT). The LOOP instruction directs the MCU to jump to a branch address if the current value within the control counter does not equal 0. If the value in the control counter is 0, the LOOP instruction directs the MCU to continue to the next microinstruction pair in the sequence. Each time a LOOP instruction is executed the control count is decremented. The branch address to which the jump is made appears directly in the current microcode output appearing on the N-bus 140.

It is the function of the MCU control logic array 130 to generate the signals necessary to execute each microinstruction. For example, in response to a LOOP instruction op code on signal line 132, and in response to an indication from comparator 155 that the control counter value is not 0, the multiplexer 138 loads the value on the N-bus 140 into the CRAR 134 and the value of the control counter within the stack 146 is decremented by one as it passes through the decrement box 156 and is returned to the stack via the multiplexer 142.

The DO Instruction (Octal 3):

The MCU DO instruction directs the MCU to jump to a sub-routine branch address if the control counter value is not equal to 0 and to continue to the next microinstruction pair in the sequence if the control counter is equal to 0. As in the case of the LOOP instruction, the control counter is decremented upon each execution of the DO instruction. Because a sub-routine is being called, however, the pointer counter 144 is also incremented. When the pointer counter 144 is incremented, the register in the sub-routine stack 150 retains the address of the next microinstruction pair to be executed in the calling routine. Thus, the sub-routine 150 saves the return address which is employed during the execution of:

The RETURN Instruction (Octal 4):

The RETURN instruction decrements the pointer counter 144 and places the return address previously saved in the control memory address register 134. The correct control counter in stack 146 is automatically pointed to by the pointer counter 144 when it is decremented upon the return to the calling sub-routine.

The USE Instruction (Octal 5):

The USE instruction directs the MCU to jump to the sub-routine branch address appearing on the N-bus and to return from this sub-routine when the generated CROM address is equal to a value placed in the programmed return address (PRA) register 162. Upon receiving a USE instruction op code, the logic array 130 sets a flip flop 164. The flip flop 164 remains set until the address in the PRA register 162 is reached, at which time the flip flop 164 is reset and the MCU control unit 130 is informed that a return is to be made to the routine whose return address is stored in the stack 150.

The JUMP Instruction (Octal 6):

The JUMP instruction directs the MCU to jump to a branch address on the N-bus, an unconditional branch which is accomplished by forcing the N-bus bits into the control memory address register 134 via the multiplexer 138.

The CALL Instruction (Octal 7):

The CALL instruction directs the MCU to jump to a sub-routine branch address on the N-bus. The return address (the current address incremented by the incrementor 158) is stored in the sub-routine stack 150. The pointer counter 144 is incremented and the current control counter value for the calling routine is saved in the stack 146.

Additional branching possibilities at the microinstruction level are created by the independent control of the value of the least significant control memory address bit in the LSB register 136. The value stored in the LSB register 136 may always be altered by one of the microbits from control memory which will herein be referred to as the microbit I7. The I7 microbit from the N-bus is applied to one input of an exclusive-OR gate 166 whose output is connected to the input of the LSB register 136. The other input to the exclusive-OR gate 166 is connected to a flag status logic unit 168. The flag status logic unit 168 receives the CNVZ status bits generated by the ALU 104 (seen in FIG. 7) and also communicates with the $F_0$, $F_{31}$, $Q_0$ and $Q_{31}$ shift control bit lines from the shifters 110 and 112 (also seen in FIG. 7). In addition, the flag status logic unit 158 receives operation code microbits over the bus 172 from the control memory 50.

The flag status logic unit 168, working in combination with the exclusive-OR gate 166, operates to select which microinstruction of the microinstruction pair addressed by the CRAR 134 is to be executed. The even or odd address of the pair may be selected in one of four ways: First, when I7 equals 0, the even member of the pair is selected. Second, when I7 equals 1, the odd member of the pair is selected. Third, one of the flag status bits (C, N, V, Z, $Q_0$, etc.) may be selected and given control over the pair identification; or fourth, when I7 is 1 the member of the pair may be defined by testing the inverse of a selected flag status bit.

Figure 9:
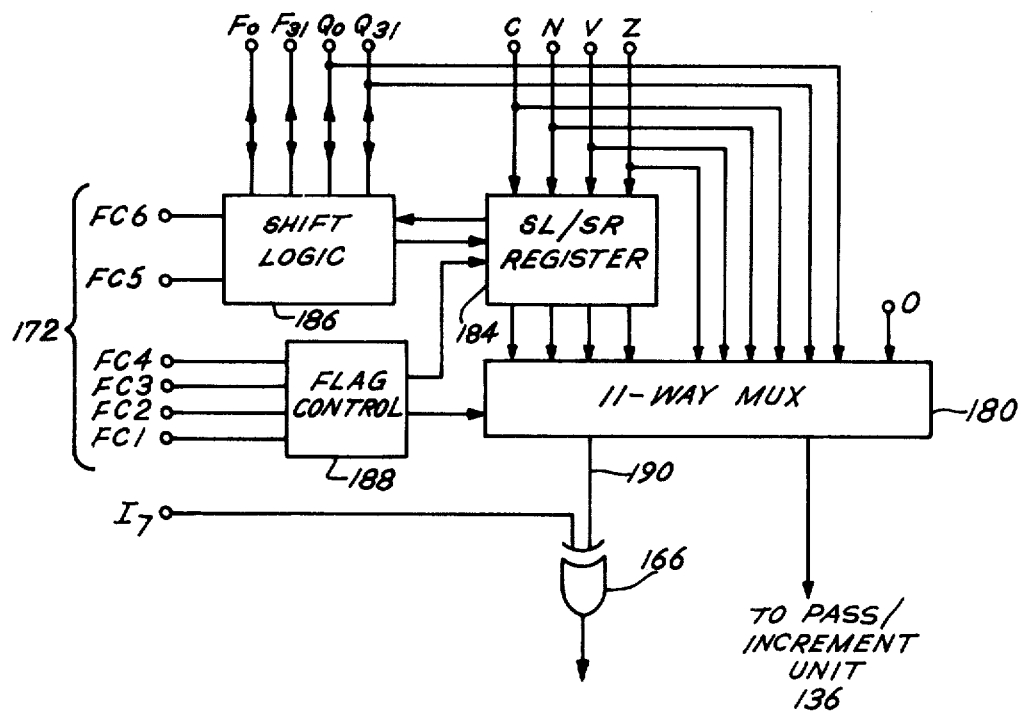
FIG. 9 illustrates in more detail the components of the flag status logic unit seen at 168 in FIG. 8.

The flag status logic unit shown at 168 in FIG. 8 is depicted in more detail in FIG. 9. The unit includes an 11-way multiplexer 180 whose inputs comprise four signal lines from a loadable shift-right/shift-left register 184, the C, N. V, Z, $Q_0$ and $Q_{31}$ lines from the ALU unit shown in FIG. 7, and a single input line held at bit value 0. Information is passed between the SL/SR register 184 and a shift logic unit 186, and the register 184 and the 11-way multiplexer operate under the control of flag control unit 188.

The flag status logic unit shown in FIG. 9 (and at 168 in FIG. 8) operates under the control of four flag status (STS) bits FC1–FC4 and two shift (SHFT) control bits FC5–FC6 applied via the signal lines 172 from CROM 50 (seen in FIG. 8).

The 11-way multiplexer 180 applies a signal to output line 190 which represents the instantaneous value of C, N, V, Z, $Q_0$ or $Q_{31}$, a previous value of C, N, V or Z stored in the SL/SR register 184, or a logical zero. By setting I7 = 1 any of these values may be inverted by gate 166.

The shift logic circuit controls the flow of data on the bidirectional shift lines $F_0$, $F_{31}$, $Q_0$ and $Q_{31}$ as well as the flow of data between the C-register in SL/SR register 184 and $Q_{31}$. Table IV below shows the relationship between the SHFT bits FC5–FC6 and the signal levels presented to the bi-directional shift line $F_{31}$, $F_0$, $Q_{31}$ and $Q_0$.

TABLE IV

| FC6 | FC5 | Operation | $F_{31}$ | $F_0$ | $Q_{31}$ | $Q_0$ |
|---|---|---|---|---|---|---|
| 0 | 0 | Arithmetic Left Shift | — | $Q_{31}$ | — | C |
| 0 | 1 | Arithmetic Right Shift | N⊕V | — | $F_0$ | — |
| 1 | 0 | Rotate Left | — | $F_{31}$ | — | C |
| 1 | 1 | Rotate Right | $F_0$ | — | $F_0$ | — |

In Table IV above, the "—" indicates that the shift logic unit presents a high impedance to the line identified (The shift logic unit 186 delivers "tri-state" output signal levels: high, low, or floating. As will be discussed later, tri-state outputs are used to implement bus-organized functions throughout the processor.) when FC6=0 and FC5=1, the exclusive-OR combination of the N (negative) and V (overflow) bits is moved to $F_{31}$.

The four-bit field FC1–FC4 provides the flag status control functions described in Table V.

TABLE V

| FC4 - FC1 | | | Action | |
|---|---|---|---|---|
| 0 0 | 0 0 | None | $I_7$ to $CRAR_0$ | Unconditional Branch |
| 0 0 | 0 1 | Store C | $I_7$ to $CRAR_0$ | Unconditional Branch |
| 0 0 | 1 0 | Store N, V, Z | $I_7$ to $CRAR_0$ | Unconditional Branch |
| 0 0 | 1 1 | Store C, N, V, Z | $I_7$ to $CRAR_0$ | Unconditional Branch |
| 0 1 | 0 0 | Shift Flag Register into $Q_0$ | $I_7$ to $CRAR_0$ | Unconditional Branch |
| 0 1 | 0 1 | Shift Flag Register Out of $Q_3$ | $I_7$ to $CRAR_0$ | Unconditional Branch |
| 0 1 | 1 0 | Instantaneous Value of $Q_0$ to $CRAR_0$ | | Conditional Branch |
| 0 1 | 1 1 | Instantaneous Value of $Q_3$ to $CRAR_0$ | | Conditional Branch |
| 1 0 | 0 0 | Stored Value of C to $CRAR_0$ | | Conditional Branch |
| 1 0 | 0 1 | Stored Value of N to $CRAR_0$ | | Conditional Branch |
| 1 0 | 1 0 | Stored Value of V to $CRAR_0$ | | Conditional Branch |
| 1 0 | 1 1 | Stored Value of Z to $CRAR_0$ | | Conditional Branch |
| 1 1 | 0 0 | Instantaneous Value of C to $CRAR_0$ | | Conditional Branch |
| 1 1 | 0 1 | Instantaneous Value of N to $CRAR_0$ | | Conditional Branch |
| 1 1 | 1 0 | Instantaneous Value of V to $CRAR_0$ | | Conditional Branch |
| 1 1 | 1 1 | Instantaneous Value of Z to $CRAR_0$ | | Conditional Branch |

According to a further feature of the microprogram control unit, means are employed for forcing the MCU to continue to the next microinstruction (that is, forcing MCU to perform the NEXT instruction), regardless of the value of the three-bit MCU op-code.

This FORCED-NEXT operation works as follows: A microcode-generated signal (produced whenever the coded value BCONDMCU occurs in the microinstruction B∅ field, to be discussed) is applied to the logic array 130 via conductor 185 as seen in FIG. 8. Array 130 also receives the four CNVZ status bus bits and a pair of microcode condition select bits (placed in bit positions 54 and 55 of the microword). When conductor 185 is energized, one of the CNVZ bits is tested as follows:

| 54-55 | Bit Tested |
|---|---|
| 00 | C |
| 01 | N |
| 10 | V |
| 11 | Z |

If the selected bit is a 1 the NEXT operation is forced. If the selected bit is a zero, the operation specified by the ALU op-code is performed.

Vertical (Encoded) Microinstructions

With the foregoing description as background, it is now possible to describe more precisely the microinstructions which control the flow of information within the processor.

Each microinstruction is a group of control signals stored as an addressable 80-bit word in the control read only memory (CROM) 50 shown in FIG. 8. Although each microinstruction could be described by a string of eighty 1's and 0's, or twenty hexadecimal characters, it is preferable to describe each microinstruction using a straight forward symbolic system of notation. That system works as follows.

Each microinstruction may be broken down into fields and each field is assigned a symbolic name. For example, the first 22 bits of each microinstruction are employed to control the MCU 54 and are defined as follows:

| BA | FIELD | 0, 13, 0 |
|---|---|---|
| N | FIELD | 0, 12, 0 |
| I7 | FIELD | 12, 1, 0 |
| MCU | FIELD | 13, 3, 0 |
| STS | FIELD | 16, 4, 0 |
| SHFT | FIELD | 20, 2, 0 |

"BA FIELD 0, 13, 0" means that the symbolic name BA is the name of a field which begins at bit position 0, has a length of 13 bits and, unless otherwise specified, has the default value of zero. Note that the field BA is redefined as the subfields N (occupying the first twelve bit positions) and I7 (in the 13th bit position).

The 13 bit field BA is the "branch address" which is made up of the 12 bit N-field applied to the N-bus 140 seen in FIG. 8, and the I7 bit applied to the LSB register 136 via the exclusive-OR gate 166. The 3-bit MCU field beginning at bit position 13 is the op code delivered over bus 132 to the MCU control logic array 130 to establish which operation (NEXT, COUNTER, LOOP, etc.) the MCU is to execute. The 4-bit STS field comprises the bits FC1–FC4 applied to the flag control unit 188 (FIG. 9), and the two SHFT bits are bits FC5 and FC6 applied to the shift logic unit 186.

Figure 10:
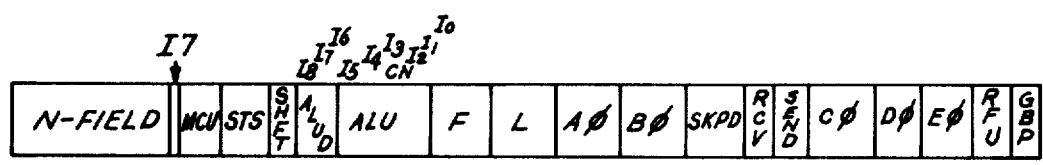
FIG. 10 illustrates the field layout of a single microinstruction as delivered by the control read only memory indicated at 50 in FIGS. 1 and 8.

The layout of the entire 80 bit microinstruction is shown in FIG. 10 of the drawings.

Figure 11:
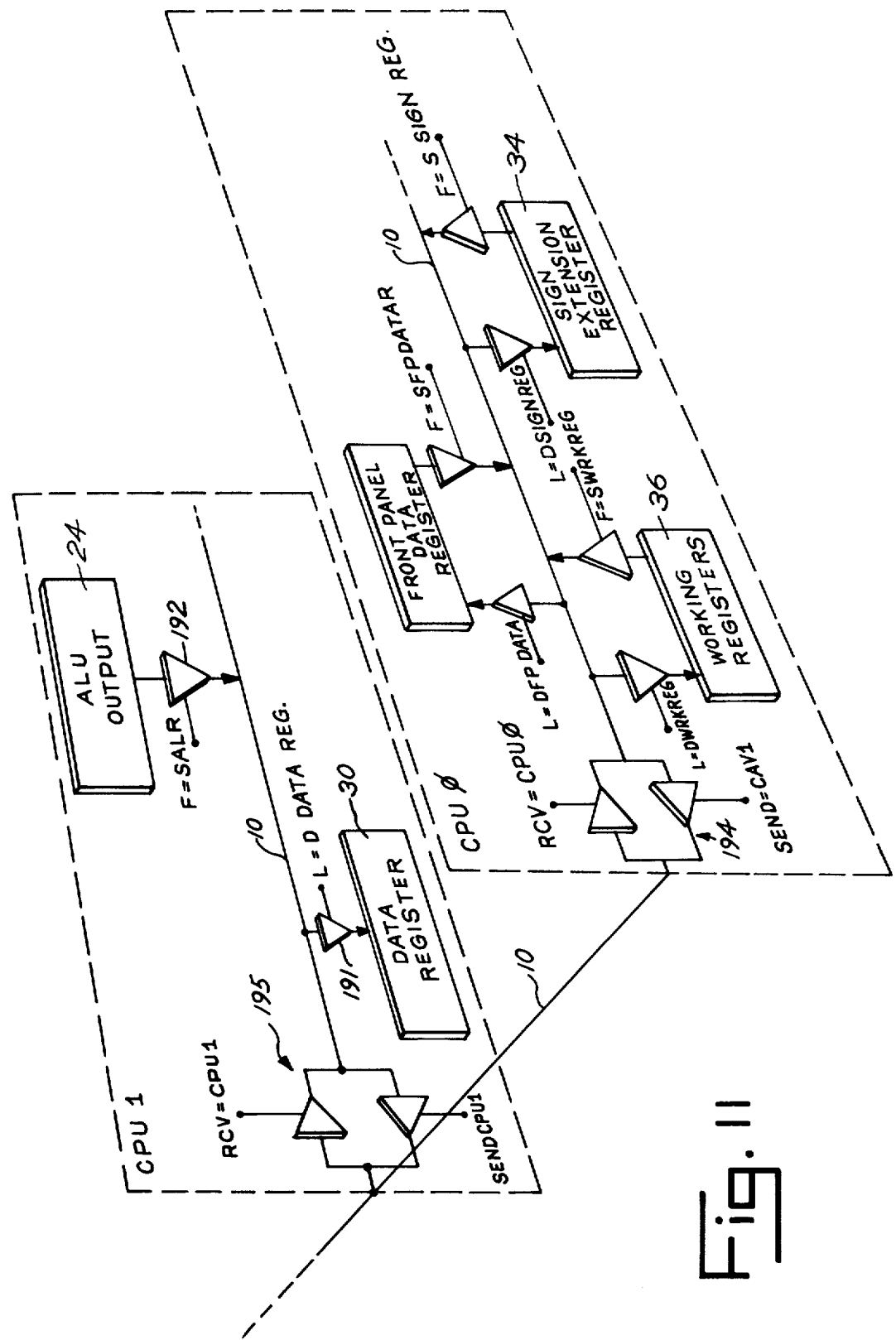
FIG. 11 is a schematicized perspective view illustrating the relationship between the circuit boards, the mother board and the tri-state send and receive bus isolation devices actuated by microcodes.

The general layout of the main CPU bus 10 is illustrated by FIG. 11 of the drawings. Each of the five registers shown by way of illustration in FIG. 11 is connected to the bus 10 by tri-state SEND and RECEIVE transceivers. For example, the data register 30 mounted on the CPU1 board receives information from the bus 10 whenever the receiver 191 is enabled. The enable input to receiver 191 is activated whenever the L field of a microinstruction contains the value DDATAREG. The input to receiver 191 presents a high impedance to the bus 10. Note that the data register 30 has no sending transceiver associated with it because it only accepts data for processing by the ALU. Similarly, the ALU output includes only a sending transceiver 192 since it is never a destination. The sending transceivers present one of three states to the bus 10: a high-impedance when not enabled, and high or low signal levels when enabled (hence the term "tri-state"). Tri-state transceivers 194 and 195 on the boards CPU∅ and CPU1 respectively are used to isolate the main bus branches on these boards when possible.

MICROCODE CONTROL

The execution of the Load Address (LA) instruction will now be discussed as an example of microcode controlled machine functions.

The Load Address instruction provides a powerful and widely used method for initializing and incrementing general registers. Though the instruction is in the RX format, it does not actually fetch data from main storage. Instead, it loads the 24-bit address of the second operand into the low order bit positions of that general register identified by the first operand.

For example, the instructions

LA 4,0(0,0)

and

LA 4,0

(as expressed in assembler language) are equivalent and may be used to clear general register 4.

The assembler language instructions

LA 4,1(4)

or

LA 4,1(4,0)

or

LA 4,1(0,4)

may be used to increment the contents of register 4 by 1.

Execution of the LA instruction requires an address calculation. The contents of the index register, the contents of the base register, and the displacement value must be summed. However, the ALU 104 (shown in FIG. 7) can add together only two input values (R and S) at a time. According to a feature of the invention, however, it is possible to shorten the execution time required to perform address calculations by taking into account the fact that the contents of each of these three registers need not be included in the sum if the value of the instruction address location specifying that register is zero.

In accordance with a further feature of the invention, when address calculations involving two levels of indexing are to be made, hardware means are employed to monitor the addresses (in the instruction register) of those general registers designated as the index and base registers, and to force a branch to that microroutine needed to handle the instruction presented.

For example, the load address instruction

Figure 12:
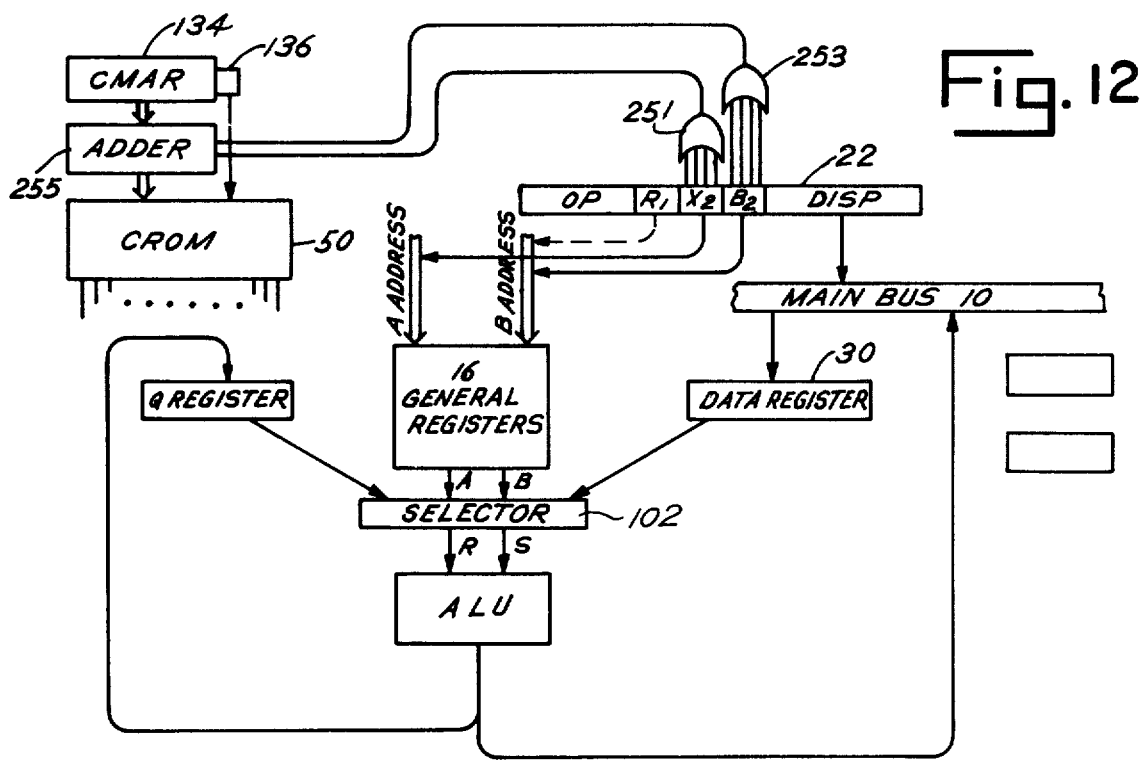
FIG. 12 is a block diagram which illustrates how the presence of non-zero base and index register address values control microroutine branching.
Figure 13:
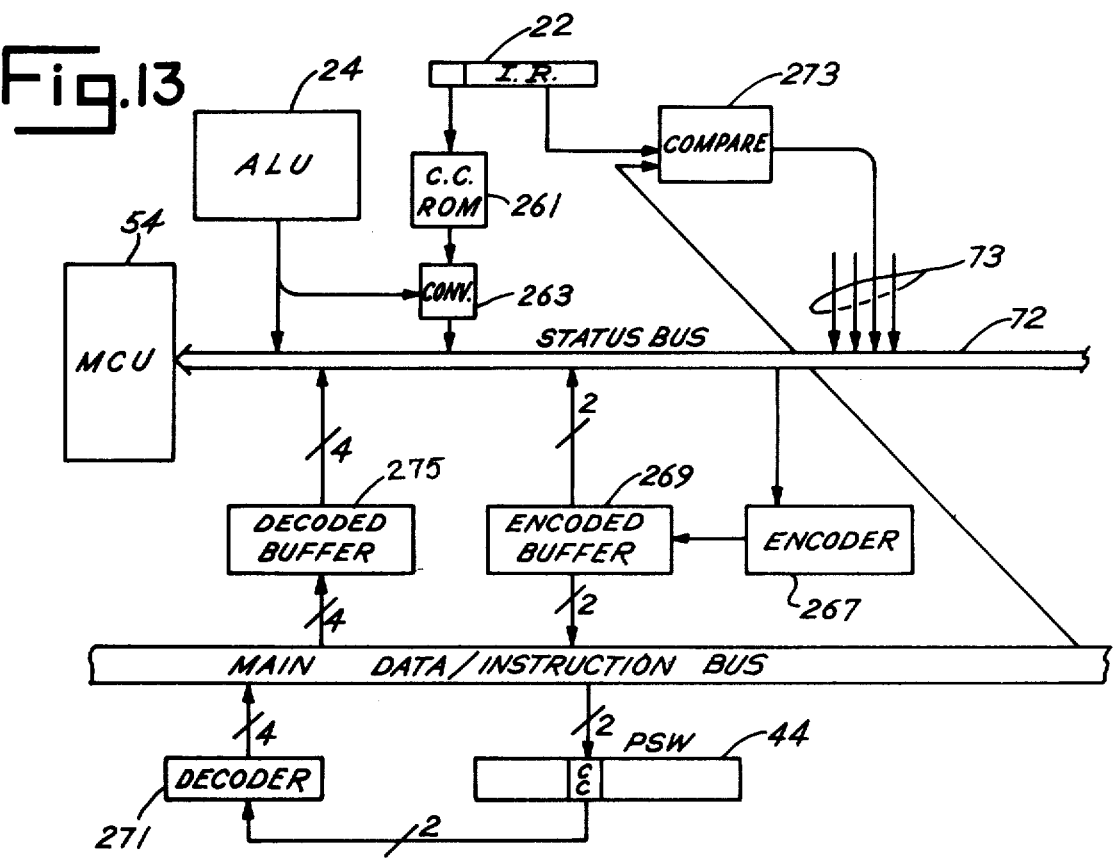

LA 4,631(3,7)

requires that the contents of registers 3 and 7 and the displacement value 631 be added and the result placed in register 4. This calculation takes place generally as follows, as depicted in FIG. 12.

During the first microinstruction cycle, the displacement value in instruction register 22 is passed via main bus 10 to the data register (latch) 30. At the same time the contents of the two general registers addressed by the values $X_2$ and $B_2$ are added and their sum placed in the Q register. Also, in this first microinstruction cycle, the values $X_2$ and $B_2$ are checked (by the OR gates 251 and 253) to produce a 2 bit value having the following meaning:

00 $X_2$ and $B_2$ both equal zero
01 $X_2$ equals zero, $B_2$ does not equal zero
10 $X_2$ does not equal zero, $B_2$ equals zero
11 Neither $X_2$ nor $B_2$ equal zero This two bit value is added by adder 255 to the address (exclusive of the LSB bit $I_7$) from the control memory address register 134 (see also FIG. 8). As a result, a hardware forced branch (call) is made to a microinstruction appropriate for handling the particular instruction. If $X_2$ and $B_2$ are both zero, the next microinstruction merely moves the displacement value in data register 30 to the Q register. If $X_2$ is zero and $B_2$ is not, the contents of the general register addressed by $B_2$ are added to the displacement in register 30 and the sum placed in the Q register. Similarly if $B_2$ is zero and $X_2$ is not, the sum of the $X_2$ register and the displacement are placed in the Q register. Finally, if neither $X_2$ nor $B_2$ are zero, their sum (already in the Q register) is added to the displacement and the final sum is placed in the Q register.

In the machine, this occurs by using the operation code (HEX41 for the LA instruction) stored in the first byte of the instruction register 22 to address the FWA ROM 56 (see FIG. 1), which then delivers the microcode first word address to the MCU 54.

It is to be understood that the specific embodiment of the invention which has been described is merely illustrative of one application of the principles of the invention. Numerous modifications may be made to the preferred embodiment which has been disclosed without departing from the true spirit and scope of the invention.

What is claimed is:

1. A central processing unit comprising, in combination:

a control memory for storing a plurality of microprogram words each of which specifies the nature of a sub-operation performed by said processing unit and each of which comprises a plurality of control fields;

a microprogram control unit comprising, in combination, first and second stack memories for respectively storing control counts and return addresses, a stack pointer counter for addressing said stack memories, means responsive to a first of said microprogram word control fields for selectively incrementing, retaining, or decrementing the count held in said stack pointer counter, means for supplying a control count from a second of said microprogram word control fields to the location in said first stack memory addressed by said stack pointer counter, and means responsive to said first control field and to the control count in the addressed location in said first stack memory for supplying microprogram word addresses to said control memory, each microprogram word address being selectively derived from (1) the return address in said second stack memory addressed by said stack pointer counter, (2) a branch address from a second of said microprogram word control fields, or (3) a current microprogram word address previously supplied to said control memory;

a plurality of bipolar integrated circuit microprocessors cascaded to form an arithmetic and logic unit and a set of general registers, said arithmetic and logic unit have a control input connected to said control memory for selecting one of a plurality of predetermined operations under the control of a third one of said fields, said set of general registers having at least one address input;

an instruction register for storing an operation code and at least one general register address;

means connected between said instruction register and said microprogram control unit for translating said operation code into an initial control memory address; and means for connecting said instruction register to said address input of said set of general registers to selectively specify at least one of said general registers in response to said at least one general register address.

* * * * *